US012622367B2

(12) United States Patent
Yang et al.

(10) Patent No.: US 12,622,367 B2
(45) Date of Patent: May 12, 2026

(54) CULTIVATION METHOD FOR MORCHELLA ON PATTERNED LAYER FRAMES

(71) Applicant: Institute of Biology, Gansu Academy of Sciences, Lanzhou (CN)

(72) Inventors: Ali Yang, Lanzhou (CN); Wenyue Du, Lanzhou (CN); Yongjun Hu, Lanzhou (CN); Yingtao Jiang, Lanzhou (CN); Zhiye Wang, Lanzhou (CN)

(73) Assignee: Institute of Biology, Gansu Academy of Sciences, Lanzhou (CN)

( * ) Notice: Subject to any disclaimer, the term of this patent is extended or adjusted under 35 U.S.C. 154(b) by 0 days.

(21) Appl. No.: 19/004,559

(22) Filed: Dec. 30, 2024

(65) Prior Publication Data

US 2025/0287885 A1　Sep. 18, 2025

(30) Foreign Application Priority Data

Mar. 16, 2024　(CN) .......................... 202410302879.9

(51) Int. Cl.
*A01G 18/69* (2018.01)
*A01G 18/20* (2018.01)
*A01G 18/62* (2018.01)
*A01G 18/00* (2018.01)

(52) U.S. Cl.
CPC ............. *A01G 18/69* (2018.02); *A01G 18/20* (2018.02); *A01G 18/62* (2018.02)

(58) Field of Classification Search
CPC ........ A01G 18/69; A01G 18/20; A01G 18/62; A01G 18/00
USPC ......................................................... 47/1.1
See application file for complete search history.

(56) References Cited

U.S. PATENT DOCUMENTS 11,925,146 B2 * 3/2024 Shi ......................... A01G 18/40

FOREIGN PATENT DOCUMENTS

| CN | 1036369 | C | * | 11/1997 | |
|----|---------|---|---|---------|---|
| CN | 101647370 | A | * | 2/2010 | |
| CN | 102808009 | A | * | 12/2012 | |
| CN | 104446822 | A | * | 3/2015 | ............... C05D 3/00 |
| CN | 105875193 | A | | 8/2016 | |
| CN | 106146090 | A | | 11/2016 | |
| CN | 104370620 | B | * | 2/2017 | ............. A01G 18/00 |
| CN | 106544279 | A | * | 3/2017 | ............. C12N 1/14 |
| CN | 106856978 | A | * | 6/2017 | ............. C05D 1/00 |
| CN | 108464193 | A | * | 8/2018 | ............. A01G 18/69 |
| CN | 108496696 | A | * | 9/2018 | ............. A01G 18/69 |
| CN | 108633619 | A | * | 10/2018 | ............. A01G 18/30 |
| CN | 108684440 | A | * | 10/2018 | ............. A01G 18/60 |
| CN | 108782007 | A | * | 11/2018 | ............. A01G 18/60 |
| CN | 108990698 | A | | 12/2018 | |
| CN | 109042090 | A | * | 12/2018 | ............. A01G 18/69 |
| CN | 105993590 | B | * | 2/2019 | ............. A01G 18/00 |
| CN | 109526548 | A | * | 3/2019 | ............. A01G 18/22 |
| CN | 109526552 | A | * | 3/2019 | ............. A01G 18/69 |
| CN | 109845576 | A | * | 6/2019 | |
| CN | 109845578 | A | * | 6/2019 | |
| CN | 107409763 | B | * | 7/2019 | ............. A01G 18/00 |
| CN | 107409764 | B | * | 7/2019 | ............. A01G 18/00 |
| CN | 110122170 | A | * | 8/2019 | ............. A01G 18/20 |
| CN | 110150025 | A | * | 8/2019 | ............. A01G 18/20 |
| CN | 110301285 | A | * | 10/2019 | ............. A01G 18/00 |
| CN | 110810122 | A | * | 2/2020 | ............. A01G 18/00 |
| CN | 111165264 | A | | 5/2020 | |
| CN | 112568055 | A | | 3/2021 | |
| CN | 113383675 | A | * | 9/2021 | ............. A01G 18/00 |
| CN | 113439609 | A | | 9/2021 | |
| CN | 113498712 | A | * | 10/2021 | ............. A01G 18/69 |
| CN | 109845577 | B | * | 11/2021 | |
| CN | 114303791 | A | | 4/2022 | |
| CN | 114946527 | A | * | 8/2022 | ............. A01G 18/00 |
| CN | 115623953 | A | * | 1/2023 | ............. A01G 18/00 |
| JP | 2002191354 | A | * | 7/2002 | ............. A61K 36/07 |
| JP | 2009017872 | A | * | 1/2009 | ............. A01G 18/20 |

(Continued)

OTHER PUBLICATIONS

Jiechhi Zhang, et al., Cold-Weather Edible Fungi, Heilongjiang Science and Technology Press, 2022, pp. 297-302, ISBN 978-7-5719-1638-1.
Guoqin Li, High-Quality and Efficient Cultivation Technology of Edible Fungi, Anhui Science & Technology Publishing House, 2021, p. 107, ISBN 978-7-5337-7787-6.
Liu Wenke, et al., Prospects in Edible Fungi Photobiology and LED Applications, Science and Technology Review, 2013, pp. 73-79, vol. 31 No. 18.
Li Tao, et al., Exogenous Nutrition Bag in Morels Cultivation: Research Progress, Chinese Agricultural Science Bulletin, 2018, pp. 65-69, vol. 34 No. 26.

(Continued)

*Primary Examiner* — David J Parsley
*Assistant Examiner* — Angelica Aljandra Almeida Bonnin
(74) *Attorney, Agent, or Firm* — Bayramoglu Law Offices LLC

(57) ABSTRACT

A cultivation method for *Morchella* on patterned layer frames is provided. The method includes: (1) preparing and laying a culture substrate, and sowing; (2) supplementing an exogenous nutrient material; (3) mycelium culture; (4) primordium induction; (5) primordium differentiation; (6) management of a young mushroom period; (7) maturity management; and (8) erchao mushroom management. The method adopts a low temperature of (5-9° C.) to promote a transformation of an exogenous nutrition and adopts a low temperature of (2-4° C.) to induce a differentiation of primordium and other measures, to address a bottleneck of industrial development that cannot continuously supply fresh *Morchella* to the market, which is caused by some problems in the cultivation of *Morchella*, such as an unstable yield and seasonal limitation in the existing cultivation of *Morchella*. The method can carry out industrial facility cultivation for *Morchella*, and can obtain *Morchella* with stable yield and good quality.

10 Claims, No Drawings

(56) References Cited

FOREIGN PATENT DOCUMENTS

| | | | | | |
|---|---|---|---|---|---|
| KR | 20020027970 | A | * | 4/2002 | ............. A23L 7/104 |
| KR | 100404333 | B1 | * | 11/2003 | ............. A01G 18/69 |

OTHER PUBLICATIONS

Deyun Zhang, et al., Cultivation Technology of Antiseason Mushroom in Facilities, Zhejiang Shiyongjun, 2008, pp. 32-34, vol. 16 No. 26.

* cited by examiner

CULTIVATION METHOD FOR MORCHELLA ON PATTERNED LAYER FRAMES

CROSS REFERENCE TO THE RELATED APPLICATIONS

This application is based upon and claims priority to Chinese Patent Application No. 202410302879.9, filed on Mar. 16, 2024, the entire contents of which are incorporated herein by reference.

TECHNICAL FIELD

The present disclosure relates to the technical field of *Morchella* cultivation, and in particular, to a cultivation method for *Morchella* on patterned layer frames.

BACKGROUND

*Morchella* is a rare and precious edible and medicinal fungus in the world. It is favored by high-end consumer markets at home and abroad because of its unique flavor, rich nutrition and important health care. In recent years, through the unremitting efforts of many scientific researchers, the artificial cultivation technology of *Morchella* has been broken through and popularized in many places in China for application.

The existing patent document with the publication number of CN113439609A (publication date: 2021 Sep. 28) disclosed an industrial cultivation method for *Morchella esculenta* and cultivation device thereof, wherein the patent adopted methods such as land pretreatment, mycelium and conidium culture, and used special inhibitors of primordia and buds; the existing patent document with the publication number CN114303791A (publication date: 2022 Apr. 12) disclosed an industrial cultivation method of *Morchella* without nutrition bags, and adopted means of controlling light and filling the culture substrate with the cultivation basket; the existing patent document with the publication number of CN110122170A (publication date: 2021 Aug. 16) disclosed a method of basket-style industrial cultivation of *Morchella*, including a step of preparing nutrient bags, a step of selecting and treating cultivation substrates, a step of preparing cultivation baskets, a step of sowing and covering soil, a step of mycelium culture management, and a step of fruiting management. In the above prior art, the yield of *Morchella* is not enough to meet the market demand, and the production cost is higher, meanwhile, it has problems such as a low fruiting rate, unstable fruiting effects and poor quality.

Therefore, it is urgent for those skilled in the art to propose a facility cultivation method for *Morchella* with a high fruiting rate, stable fruiting effects and good quality.

SUMMARY

A purpose of the present disclosure is to provide a cultivation method for *Morchella* on patterned layer frames. The present disclosure adopts a low temperature of (5-9° C.) to promote a transformation of an exogenous nutrition and adopts a low temperature of (2-4° C.) to induce a differentiation of primordium and other measures, to address a bottleneck of industrial development that cannot continuously supply fresh *Morchella* to the market, which is caused by some problems in the cultivation of *Morchella*, such as an unstable yield and seasonal limitation in the existing cultivation of *Morchella*. According to the method of the present disclosure, industrial facility cultivation for *Morchella* can obtain *Morchella* with a stable yield and excellent quality.

In order to achieve the above purpose, the present disclosure adopts the following technical solutions.

The present disclosure provides a cultivation method for *Morchella* on patterned layer frames, including the following steps:

(1) preparing and laying a culture substrate, and sowing;

(2) supplementing an exogenous nutrient material, and controlling a temperature of the culture substrate at (5-9° C.), to perform transformation of exogenous nutrition;

(3) controlling a temperature of the culture substrate at (5-9° C.), to perform mycelium culture;

(4) controlling a temperature of the culture substrate at (2-4)° C. after the mycelium matures, to perform primordium induction;

(5) primordium differentiation; and a temperature of the culture substrate during primordium differentiation is (5-9° C.);

(6) management of a young mushroom period; and a temperature of the culture substrate at the young mushroom period is (9-12° C.);

(7) maturity management: a temperature of the culture substrate is (12-16)° C. in the mature period; and (8) second flush mushroom management.

Preferably, the culture substrate is made of raw materials including the following weight percentages: 34-55% mountain raw soil, 40-60% grass carbon, 1-3% caustic lime, 2-4% gypsum, 0.05-0.2% potassium dihydrogen phosphate;

a preparation method of the culture substrate includes: mixing each raw material, adjusting a water content to 20-30% using an aqueous solution containing 2% formaldehyde, and sealing for more than 5 days; and a laying thickness of the culture substrate is (20-30) cm.

Preferably, a method of the sowing includes: evenly spreading *Morchella* strain blocks with a size of (1-1.5) cm on a bed surface according to (0.4-0.6) kg per square meter, covering the culture substrate with a thickness of (1-2) cm, setting an ambient temperature to (10-15° C.), air humidity to (70-80) %, and a concentration of carbon dioxide to (500-800) ppm, and culturing in conditions without light.

Preferably, the exogenous nutrient material is made from raw materials including the following weight percentages: 55-65% wheat, 30-40% corn core, 1-2% caustic lime, 1-2% gypsum and 0.5-2% potassium dihydrogen phosphate; and supplement time of the exogenous nutrient material is (2-4) days after sowing, and a supplement amount of the exogenous nutrient material is (4-8) kg per square meter; during the transformation of the exogenous nutrition, a water content of the culture substrate is (20-25) %, a concentration of carbon dioxide is (500-800) ppm, air humidity is (70-80) %, and performing the transformation without light for (5-7) days.

Preferably, when culturing the mycelium, controlling a water content of the culture substrate to (20-25) %, air humidity to (70-80) %, a concentration of carbon dioxide to (800-1500) ppm, and performing cultivation without light for (45-60) days.

Preferably, a water content and air humidity of the culture substrate during the primordium induction are consistent with those during the mycelium culture; and time of the primordium induction is (3-7) days; and after the primordium induction, removing the exogenous nutrient material, and reducing a concentration of carbon dioxide to 500 ppm by ventilation; and during the ventilation period, a water content of the culture substrate is (25-30) %, a temperature of the culture substrate is (5-9° C.), air humidity is (70-80) %, a light intensity is (400-600) lx, a light source is a red light, and treatment is performed under alternating cycles of light (8-12) h and dark (4-6) h.

Preferably, during the primordium differentiation, controlling a water content of the culture substrate to (25-28) %, air humidity to (90-95) %, a concentration of carbon dioxide below 800 ppm, a light intensity to (400-600) lx, and a light source to be a red light, and treatment is performed under alternating cycles of light (8-12) h and dark (4-6) h until the primordium differentiates and develops to more than 1.5 cm.

Preferably, during the management of the young mushroom period, controlling a water content of the culture substrate to (25-28) %, air humidity to (80-90) %, a concentration of carbon dioxide below 800 ppm, and a light intensity to (400-600) lx, and a light source to be a red light, and treatment is performed under alternating cycles of light (8-12) h and dark (4-6) h until the primordium differentiates and develops to more than 3 cm.

Preferably, during the management of the mature period, controlling a water content of the culture substrate to (20-25) %, air humidity to (70-85) %, a concentration of carbon dioxide below 800 ppm, and a light intensity to (400-600) lx, and a light source to be a red light, and treatment is performed under alternating cycles of light (8-12) h and dark (4-6) h until ascocarps of the *Morchella* reach more than 7 cm for harvesting.

Preferably, a method for second flush mushroom management is as follows: after completing all the harvest, digging out residual stipes in the soil, clearing dead mushrooms, adjusting a water content of the culture substrate to (25-28) % using (0.05-0.2) % caustic lime water, and repeating the steps (5)-(7).

The present disclosure provides a cultivation method for *Morchella* on patterned layer frames.

The present disclosure has the following advantages over inventions of the same type:

(1) the preparation and treatment of the unique culture substrate of the present disclosure can make industrial layer frames cultivation of *Morchella* produce mushrooms steadily;

(2) the present disclosure has a more detailed management process, and sets the boundaries of primordium induction, primordium differentiation, young mushroom management and different management data, so that the cultivation conditions of *Morchella* in each period of growth can be controlled, and can be directly managed by equipment, which is more convenient; and (3) the present disclosure proposes a low temperature of (5-9° C.) to promote the transformation of the exogenous nutrition, and proposes a measure for inducing primordium differentiation at a low temperature of (2-4° C.), to improve the transformation efficiency of the exogenous nutrition and the effect of the primordium differentiation with low-temperature induction.

Adopting the method of the present disclosure to carry out industrial cultivation of *Morchella*, not only can the quality of *Morchella* be excellent, the mushroom production is uniform, the yield is stable, and it can reach about 1.8 kg per square meter, but also it is not limited by the season and can sustainably supply market demand, which greatly saves manpower and is more convenient for agricultural promotion.

DETAILED DESCRIPTION OF THE EMBODIMENTS

In the following, the technical solutions provided by the present disclosure are described in detail in combination with embodiments, but they cannot be understood as limiting the scope of protection of the present disclosure.

Embodiment 1

In the present embodiment, formulas of culture substrates was studied, and the specific process was as follows:

(1) according to formulas of culture substrates shown in Table 1, the culture substrates were prepared. A water content in the substrate was adjusted to 25% by an aqueous solution containing 2% formaldehyde, and the substrate was encapsulated by plastic film for 5 d until serve. Before sowing, each culture substrate was evenly spread on culture frames of a mushroom house with a thickness of 25 cm, respectively.

TABLE 1

| | Culture substrate formulas | | | | |
|---|---|---|---|---|---|
| Substrate formula | Grass carbon/% | Mountain raw soil/% | Caustic lime/% | Gypsum/% | Potassium dihydrogen phosphate/% |
| No. 1 | 60 | 34.9 | 2 | 3 | 0.1 |
| No. 2 | 50 | 44.9 | 2 | 3 | 0.1 |
| No. 3 | 40 | 54.9 | 2 | 3 | 0.1 |
| No. 4 | 30 | 64.9 | 2 | 3 | 0.1 |
| No. 5 | 20 | 74.9 | 2 | 3 | 0.1 |

Note:
the mountain raw soil is taken from the ground layer (also known as the parent material layer), which is located at a depth of 50-60 cm below the surface of the soil. This layer is less affected by the surface climate, has less available nutrients, and less root distribution. Generally, this layer of soil is called raw soil or dead soil. Raw soil has the characteristics of less pathogens and no pests.

Note: the mountain raw soil is taken from the ground layer (also known as the parent material layer), which is located at a depth of 50-60 cm below the surface of the soil. This layer is less affected by the surface climate, has less available nutrients, and less root distribution. Generally, this layer of soil is called raw soil or dead soil. Raw soil has the characteristics of less pathogens and no pests.

(2) Sowing

The cultivated species of *Morchella sextelata* were broken into strain blocks with a size of 1 cm, the strain blocks were evenly spread on the culture substrate according to 0.5 kg per square metre, and then covered by the culture substrate with a thickness of 1.5 cm. An ambient temperature was adjusted to 12° C., air humidity was adjusted to 70%, a concentration of carbon dioxide was adjusted to 500 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 5° C., air humidity was adjusted to 70%, a concentration of carbon dioxide was adjusted to 500 ppm, and the culture was performed in dark for 7 days. A formula of the exogenous nutrient material was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 5° C., air humidity was adjusted to 70%, a concentration of carbon dioxide was adjusted to 800 ppm, and the culture was performed in dark for 45 d.

(5) Primordium Induction

After the mycelium was physiologically mature, a temperature of the culture substrate was adjusted to 3° C., the other conditions were unchanged (consistent with the mycelium culture stage), and the primordium induction was performed for 3 days.

After the primordium induction was completed, a bag for the exogenous nutrient material was removed, and the ventilation was performed to reduce a concentration of carbon dioxide to 500 ppm, during the ventilation period, a water content of the culture substrate was adjusted to 28%, a temperature was adjusted to 5° C., air humidity was adjusted to 70%, a light intensity was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 5° C., air humidity was controlled to 90%, a concentration of carbon dioxide was controlled to 500 ppm, a light intensity was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 9° C., air humidity was adjusted to 90%, a concentration of carbon dioxide was adjusted to 500 ppm, a light intensity was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 12° C., air humidity was adjusted to 80%, a concentration of carbon dioxide was adjusted to 500 ppm, a light intensity was adjusted to 500 lx, and the treatment was performed under alternating cycles of light 10 h and dark 5 h until ascocarps of the *Morchella* reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

The yields of *Morchella* under different culture substrates were counted, and the statistical results were shown in Table 2.

TABLE 2

Yields of Morchella under different culture substrates

| Substrate formulation | Yield kg/m$^2$ |
| --- | --- |
| No. 1 | 1.35 |
| No. 2 | 1.68 |
| No. 3 | 1.35 |
| No. 4 | 0.85 |
| No. 5 | 0.62 |

From Table 2, it could be seen that when the grass carbon content was 50% and the mountain soil content was 44.9%, the yield was the best, when the grass carbon content exceeded 50%, the yield would no longer increase, when the grass carbon content was below 30%, the yield drastically reduced. Therefore, the addition of 40%-60% grass carbon could be considered in production.

Embodiment 2

In the present embodiment, culture light sources of *Morchella* were studied, and the process was as follows:
taking red light, blue light and white light as light sources, *Morchella* was cultivated under different light sources as follows:

(1) Preparing and Laying a Culture Substrate 44.9% mountain raw soil, 50% grass carbon, 2% caustic lime, 3% gypsum, 0.1% potassium dihydrogen phosphate were mixed evenly, and a water content in the substrate was adjusted to 25% by an aqueous solution containing 2% formaldehyde, and the substrate was encapsulated by a plastic film for 5 days until serve. Before sowing, the culture substrate was evenly spread on culture frames of a mushroom house with a thickness of 25 cm.

(2) Sowing

The cultivated species of *Morchella sextelata* were broken into strain blocks with a size of 1 cm, the strain blocks were evenly spread on the culture substrate according to 0.5 kg per square metre, and then covered by the culture substrate with a thickness of 1.5 cm. An ambient temperature was adjusted to 12° C., air humidity was adjusted to 70%, a concentration of carbon dioxide was adjusted to 500 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 5° C., air humidity was adjusted to 70%, a concentration of carbon dioxide was adjusted to 500 ppm, and the culture was performed in dark for 7 days. A formula of the exogenous nutrient material was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 5° C., air humidity was adjusted to 70%, a concentration of carbon dioxide was adjusted to 800 ppm, and the culture was performed in dark for 45 days.

(5) Primordium Induction

After the mycelium was physiologically mature, a temperature of the culture substrate was adjusted to 3° C., the other conditions were unchanged (consistent with the mycelium culture stage), and the primordium induction was performed for 3 d.

After the primordium induction was completed, a bag for the exogenous nutrient material was removed, and the ventilation was performed to reduce a concentration of carbon dioxide to 500 ppm, during the ventilation period, a water content of the culture substrate was adjusted to 28%, a temperature was adjusted to 5° C., air humidity was adjusted to 70%, a light intensity was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 5° C., air humidity was controlled to 90%, a concentration of carbon dioxide was controlled to 500 ppm, a light intensity was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 9° C., air humidity was adjusted to 90%, a concentration of carbon dioxide was adjusted to 500 ppm, a light intensity was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 12° C., air humidity was adjusted to 80%, a concentration of carbon dioxide was adjusted to 500 ppm, a light intensity was adjusted to 500 lx, and the treatment was performed under alternating cycles of light 10 h and dark 5 h until ascocarps of the *Morchella* reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

The yields of *Morchella* under different light sources were counted, and the statistical results were shown in Table 3.

TABLE 3

| Yields of Morchella under different light sources | |
| --- | --- |
| Light source | Yield kg/m$^2$ |
| Red light, | 1.58 |
| Blue light | 1.34 |
| White light | 1.18 |

It could be seen from Table 3 that different light sources had a certain effect on the yield of *Morchella*.

Embodiment 3

In the present embodiment, growth time and yield of different varieties of *Morchella* were studied, and the process was as follows:

Taking *Morchella sextelata* (Med-6) and *Morchella septimelata* (Mel-7) as experimental materials, they were cultivated as follows:

(1) Preparing and Laying a Culture Substrate 44.9% mountain raw soil, 50% grass carbon, 2% caustic lime, 3% gypsum, 0.1% potassium dihydrogen phosphate were mixed evenly, and a water content in the substrate was adjusted to 25% by an aqueous solution containing 2% formaldehyde, and the substrate was encapsulated by a plastic film for 5 d until serve. Before sowing, the culture substrate was evenly spread on culture frames of a mushroom house with a thickness of 25 cm.

(2) Sowing

The cultivated species of *Morchella* were broken into strain blocks with a size of 1 cm, the strain blocks were evenly spread on the culture substrate according to 0.5 kg per square metre, and then covered by the culture substrate with a thickness of 1.5 cm. An ambient temperature was adjusted to 12° C., air humidity was adjusted to 70%, a concentration of carbon dioxide was adjusted to 500 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 5° C., air humidity was adjusted to 70%, a concentration of carbon dioxide was adjusted to 500 ppm, and the culture was performed in dark. A formula of the exogenous nutrient material was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 5° C., air humidity was adjusted to 70%, a concentration of carbon dioxide was adjusted to 800 ppm, and the culture was performed in dark for 45 days.

(5) Primordium Induction

After the mycelium was physiologically mature, a temperature of the culture substrate was adjusted to 3° C., the other conditions were unchanged (consistent with the mycelium culture stage), and the primordium induction was performed for 3 d.

After the primordium induction was completed, a bag for the exogenous nutrient material was removed, and the ventilation was performed to reduce a concentration of carbon dioxide to 500 ppm, during the ventilation period, a water content of the culture substrate was adjusted to 28%, a temperature was adjusted to 5° C., air humidity was adjusted to 70%, a light intensity (red light) was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 5° C., air humidity was controlled to 90%, a concentration of carbon dioxide was controlled to 500 ppm, a light intensity (red light) was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 9° C., air humidity was adjusted to 90%, a concentration of carbon dioxide was adjusted to 500 ppm, a light intensity (red light) was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 12° C., air humidity was adjusted to 80%, a concentration of carbon dioxide was adjusted to 500 ppm, a light intensity (red light) was adjusted to 500 lx, and the treatment was performed under alternating cycles of light 10 h and dark 5 h until ascocarps of the *Morchella* reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

The total test durations (from sowing to the first harvest) and yields of the two varieties of *Morchella* were counted, and he statistical results are shown in Table 4.

TABLE 4

| | The total test durations and yields of different varieties of Morchella | |
|---|---|---|
| Variety | Total test duration/d | Yield kg/m$^2$ |
| Med-6 | 90 | 1.41 |
| Med-7 | 75 | 1.12 |

Note:

Med-6: after 3 days after sowing, a bag for exogenous nutrition was placed, 7 days after placing the bag for the exogenous nutrient, the mycelium culture stage was entered, which lasted for 50 days, then the primordium induction was performed for 5 days, the differentiation and maturation were performed for 25 days, and the total duration was 90 days. Med-7: after 3 days after sowing, a bag for exogenous nutrition was placed, 7 days after placing the bag for the exogenous nutrient, the mycelium culture stage was entered, which lasted for 40 days, then the primordium induction was performed for 5 days, the differentiation and maturation were performed for 20 days, and the total duration was 75 days.

It could be seen from Table 4 that the growth time and yield of *Morchella* were related to the variety, the growth time of Med-6 was longer, but the yield is higher, while the growth time of Med-7 is shorter and the yield is less.

Embodiment 4

In the present embodiment, the cultivation methods of *Morchella sextelata* and *Morchella esculenta* were studied, respectively, and the process was as follows:

1. The Effect of the Thickness of the Culture Substrate on the Test Duration and Yield of *Morchella*

Compared with the cultivation process of Embodiment 3, the difference was that the coverage thicknesses of the culture substrate in step (2) were set to 1 cm, 2 cm and 3 cm, respectively. The total test duration and yield of *Morchella* cultivated under different coverage thicknesses were counted, and the statistical results were shown in Table 5.

TABLE 5

| | The total test duration and yield of Morchella under different coverage thicknesses | | |
|---|---|---|---|
| Variety | Coverage thickness/cm | Total test duration/d | Yield kg/m$^2$ |
| Med-6 | 3 cm | 100 d | 1.38 |
| | 2 cm | 92 d | 1.65 |
| | 1 cm | 87 d | 1.72 |
| Med-7 | 3 cm | 89 d | 1.24 |
| | 2 cm | 78 d | 1.47 |
| | 1 cm | 75 d | 1.70 |

It could be seen from Table 5, the two varieties of *Morchella* showed that the thicker the coverage, the lower the yield. This was because when the coverage of the culture substrate was thick, the differentiation was delayed, the fruiting was delayed, and the yield was not increased. Therefore, in production, a covering thickness of 1 cm was sufficient to completely cover the strain.

2. The Effect of Sowing Method on the Test Duration and Yield of *Morchella*

Compared with the cultivation process of Embodiment 3, the difference was that, the sowing methods in step (2) were set as furrow sowing (a depth of the furrow sowing was 5 cm and a spacing was 20 cm) and broadcast sowing, and the seeding rate was consistent with the Embodiment 3. The total test duration and yield of *Morchella* cultivated under different sowing methods were counted, and the statistical results were shown in Table 6.

TABLE 6

| | Total test durations and yield of Morchella under different sowing methods | | |
|---|---|---|---|
| Variety | Sowing method | Total test duration/d | Yield kg/m$^2$ |
| Med-6 | Furrow sowing | 90 | 1.43 |
| | Broadcast sowing | 85 | 1.22 |
| Med-7 | Furrow sowing | 75 | 1.31 |
| | Broadcast sowing | 69 | 1.24 |

From Table 6, it could be seen that when the two varieties of *Morchella* adopted furrow sowing, the test duration increased and the yield also increased, when adopting the broadcast sowing, the test duration was shortened, and the yield was also reduced. This was because furrow sowing was about 5 days later than broadcast sowing in primordium differentiation. Based on an overall consideration, it was recommended to use broadcast sowing in production.

3. Effect of Transformation Temperature of the Exogenous Nutrition on the Test Duration and Yield of *Morchella*

Compared with the cultivation process of Embodiment 3, the difference was that the temperatures of the culture substrate in step (3) were set to 3° C., 5° C., 7° C., 9° C., and 12° C., respectively. The total test duration and yield of *Morchella* cultivated under different transformation temperatures of the exogenous nutrition were counted, and the statistical results were shown in Table 7.

TABLE 7

| | The total test duration and yield of Morchella under different transformation temperatures of the exogenous nutrition | | |
|---|---|---|---|
| Variety | Temperature/° C. | Total test duration/d | Yield kg/m$^2$ |
| Med-6 | 3 | 95 | 1.05 |
| | 5 | 92 | 1.72 |
| | 7 | 88 | 1.78 |
| | 9 | 90 | 1.70 |
| | 12 | 90 | 1.31 |
| Med-7 | 3 | 85 | 1.28 |
| | 5 | 75 | 1.78 |
| | 7 | 78 | 1.74 |
| | 9 | 80 | 1.65 |
| | 12 | 82 | 1.20 |

It could be seen from Table 7 that the two varieties of *Morchella* in the range of (5-9° C.) for the transformation of the exogenous nutrition, the test duration was short, the yield was high, when the temperature was at below 5° C. or higher than 9° C., the yield was lower.

4. Effect of Differentiation Temperature for the Primordium Induction on the Test Duration and Yield of *Morchella*

Compared with the cultivation process of Embodiment 3, the difference was that in step (5), the temperatures of the substrate after mycelium maturation were set to 2° C., 4° C., 6° C. and 8° C., respectively. The total test duration and yield of *Morchella* cultivated at different differentiation temperatures for the primordium induction were counted, and the statistical results were shown in

11

TABLE 8

The total test duration and yield of Morchella under different
temperatures for the primordium induced differentiation

| Variety | Temperature/° C. | Total test duration/d | Yield kg/m² |
|---------|------------------|----------------------|-------------|
| Med-6 | 2 | 86 | 1.65 |
| | 4 | 85 | 1.74 |
| | 6 | 92 | 1.67 |
| | 8 | 95 | 1.30 |
| Med-7 | 2 | 76 | 1.62 |
| | 4 | 78 | 1.64 |
| | 6 | 80 | 1.50 |
| | 8 | 82 | 1.27 |

It could be seen from Table 8 that the two varieties of Morchella were performed primordium induced differentiation in the range of (2-4° C.), the test duration was short, and the yield was high, when the temperature was higher than 4° C., the test duration increased significantly, but the yield changed little.

Embodiment 5

Combined with the experimental results of Embodiments 1-4, the present embodiment provided a cultivation method for Morchella, and the process was as follows:

(1) Preparing and Laying a Culture Substrate 44.9% mountain raw soil, 50% grass carbon, 2% caustic lime, 3% gypsum, and 0.1% potassium dihydrogen phosphate were mixed evenly, and a water content in the substrate was adjusted to 25% by an aqueous solution containing 2% formaldehyde, and the substrate was encapsulated by a plastic film for 5 days until serve. Before sowing, the culture substrate was evenly spread on culture frames of a mushroom house with a thickness of 25 cm. The mushroom house was closed for 3 days, and sowing could be done after 1 day of strong wind.

(2) Sowing

The cultivated species of Morchella sextelata were broken into strain blocks with a size of 1 cm, the strain blocks were evenly spread on the culture substrate according to 0.5 kg per square metre, and then covered by culture substrate with a thickness of 1 cm. A temperature of the mushroom house was adjusted to 12° C., air humidity was adjusted to 70%, a concentration of carbon dioxide was adjusted to 500 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 5° C., air humidity was adjusted to 70%, a concentration of carbon dioxide was adjusted to 500 ppm, and the culture was performed in dark for 7 days. A formula of the exogenous nutrient materials was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 5° C., air humidity was adjusted to 70%, a concentration of carbon dioxide was adjusted to 800 ppm, and the culture was performed in dark for 45 days.

(5) Primordium Induction

After the mycelium was physiologically mature, a temperature of the culture substrate was adjusted to 3° C., the other conditions were unchanged (consistent with the mycelium culture stage), and the primordium induction was performed for 3 days.

After the primordium induction was completed, a bag for the exogenous nutrient materials was removed, and the ventilation was performed to reduce a concentration of carbon dioxide to 500 ppm, during the ventilation period, a water content of the culture substrate was adjusted to 28%, a temperature was adjusted to 5° C., air humidity was adjusted to 70%, a light intensity (red light) was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 5° C., air humidity was controlled to 90%, a concentration of carbon dioxide was controlled to 500 ppm, a light intensity (red light) was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 9° C., air humidity was adjusted to 90%, a concentration of carbon dioxide was adjusted to 500 ppm, a light intensity (red light) was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 12° C., air humidity was adjusted to 80%, a concentration of carbon dioxide was adjusted to 500 ppm, a light intensity (red light) was adjusted to 500 lx, and the treatment was performed under alternating cycles of light 10 h and dark 5 h until ascocarps of the Morchella reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

Under the above cultivation method, the total test duration was 78 days, and the yield of Morchella was 1.73 kg/m².

Embodiment 6

Combined with the experimental results of Embodiments 1-4, the present embodiment provided a cultivation method for Morchella, and the process was as follows:

(1) Preparing and Laying a Culture Substrate 54.9% mountain raw soil, 40% grass carbon, 2% caustic lime, 3% gypsum, and 0.1% potassium dihydrogen phosphate were mixed evenly, and a water content in the substrate was adjusted to 25% by an aqueous solution containing 2% formaldehyde, and the substrate was encapsulated by a plastic film for 5 days until serve. Before sowing, the culture substrate was evenly spread on culture frames of a mushroom house with a thickness of 25 cm. The mushroom house was closed for 3 days, and sowing could be done after 1 day of strong wind.

(2) Sowing

The cultivated species of Morchella sextelata were broken into strain blocks with a size of 1 cm, the strain blocks were evenly spread on the culture substrate according to 0.5 kg per square metre, and then covered by culture substrate with a thickness of 1 cm. A temperature of the mushroom house was adjusted to 14° C., air humidity was adjusted to 75%, a concentration of carbon dioxide was adjusted to 650 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 7° C., air humidity was adjusted to 75%, a concentration of carbon dioxide was adjusted to 700 ppm, and the culture was performed in dark for 7 days. A formula of the exogenous nutrient material was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 7° C., air humidity was adjusted to 75%, a concentration of carbon dioxide was adjusted to 1200 ppm, and the culture was performed in dark for 50 days.

(5) Primordium Induction

After the mycelium was physiologically mature, a temperature of the culture substrate was adjusted to 4° C., the other conditions were unchanged (consistent with the mycelium culture stage), and the primordium induction was performed for 5 days.

After the primordium induction was completed, a bag for the exogenous nutrient materials was removed, and the ventilation was performed to reduce a concentration of carbon dioxide to 500 ppm, during the ventilation period, a water content of the culture substrate was adjusted to 28%, a temperature was adjusted to 7° C., air humidity was adjusted to 75%, a light intensity (red light) was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 5° C., air humidity was controlled to 92%, a concentration of carbon dioxide was controlled to 500 ppm, a light intensity (red light) was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 10° C., air humidity was adjusted to 90%, a concentration of carbon dioxide was adjusted to 600 ppm, a light intensity (red light) was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 14° C., air humidity was adjusted to 80%, a concentration of carbon dioxide was adjusted to 650 ppm, a light intensity (red light) was adjusted to 500 lx, and the treatment was performed under alternating cycles of light 10 h and dark 5 h until ascocarps of the *Morchella* reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

Under the above cultivation method, the total test duration was 80 days, and the yield of *Morchella* was 1.80 kg/m².

Embodiment 7

Combined with the experimental results of Embodiments 1-4, the present embodiment provided a cultivation method for *Morchella*, and the process was as follows:

(1) Preparing and Laying a Culture Substrate 34.9% mountain raw soil, 60% grass carbon, 2% caustic lime, 3% gypsum, and 0.1% potassium dihydrogen phosphate were mixed evenly, and a water content in the substrate was adjusted to 25% by an aqueous solution containing 2% formaldehyde, and the substrate was encapsulated by a plastic film for 5 days until serve. Before sowing, the culture substrate was evenly spread on culture frames of a mushroom house with a thickness of 25 cm. The mushroom house was closed for 3 days, and sowing could be done after 1 day of strong wind.

(2) Sowing

The cultivated species of *Morchella sextelata* were broken into strain blocks with a size of 1 cm, the strain blocks were evenly spread on the culture substrate according to 0.5 kg per square metre, and then covered by the culture substrate with a thickness of 1 cm. A temperature of the mushroom house was adjusted to 12° C., air humidity was adjusted to 70%, a concentration of carbon dioxide was adjusted to 500 ppm, and the culture was performed in dark for 3 days.

(3) Supplementing Exogenous Nutrient Materials

After 3 days of sowing, 5 kg of the exogenous nutrient materials were added per square meter, a temperature of the culture substrate was adjusted to 9° C., air humidity was adjusted to 80%, a concentration of carbon dioxide was adjusted to 800 ppm, and the culture was performed in dark for 7 days. A formula of the exogenous nutrient materials was: 61% wheat, 35% corn core, 1.5% caustic lime, 1.5% gypsum and 1% potassium dihydrogen phosphate.

(4) Mycelium Culture

A water content of the culture substrate was adjusted to 25%, a temperature of the culture substrate was adjusted to 9° C., air humidity was adjusted to 80%, a concentration of carbon dioxide was adjusted to 1500 ppm, and the culture was performed in dark for 50 days.

(5) Primordium Induction

After the mycelium was physiologically mature, a temperature of the culture substrate was adjusted to 4° C., the other conditions were unchanged (consistent with the mycelium culture stage), and the primordium induction was performed for 7 days.

After the primordium induction was completed, a bag for the exogenous nutrient materials was removed, and the ventilation was performed to reduce a concentration of carbon dioxide to 500 ppm, during the ventilation period, a water content of the culture substrate was adjusted to 28%, a temperature was adjusted to 9° C., air humidity was adjusted to 80%, a light intensity (red light) was adjusted to 500 lx, and the treatment was performed under alternating cycles of light 10 h and dark 5 h.

(6) Primordium Differentiation

A water content of the culture substrate was controlled to 28%, a temperature of the culture substrate was controlled to 9° C., air humidity was controlled to 95%, a concentration of carbon dioxide was controlled to 800 ppm, a light intensity (red light) was controlled to 500 lx, and the treatment was performed under alternating cycles of light 10 h and dark 5 h until the primordium differentiated and developed to 1.5 cm.

(7) Young Mushroom Period

A water content of the culture substrate was adjusted to 28%, a temperature of the culture substrate was adjusted to 12° C., air humidity was adjusted to 90%, a concentration of carbon dioxide was adjusted to 800 ppm, a light intensity (red light) was controlled to 500 lx, and the treatment was performed under alternating cycles of light 10 h and dark 5 h until the primordium differentiated and developed to 3 cm.

(8) Mature Period

A water content of the culture substrate was adjusted to 25%, a temperature of the culture substrate was adjusted to 16° C., air humidity was adjusted to 80%, a concentration of carbon dioxide was adjusted to 800 ppm, a light intensity (red light) was adjusted to 500 lx, and the treatment was performed under alternating cycles of light 10 h and dark 5 h until ascocarps of the *Morchella* reached more than 7 cm for harvesting.

(9) Second Flush Mushroom Management

After all the harvest was completed, residual stipes in the soil should be dug out, dead mushrooms were cleared, and a water content of the culture substrate was adjusted to 25% by 0.1% caustic lime water, and then the management was performed with reference to the primordium differentiation, young mushroom period and mature period.

Under the above cultivation method, the total test duration was 85 days, and the yield of *Morchella* was 1.67 kg/m$^2$.

Contrast Example 1

The present contrast example adopted a cultivation method of the prior art of CN 110122170 A, *Morchella sextelata* was taken as a strain, and the process was as follows:

(1) the wheat grains and wood chips were mixed, and the dry mass ratios of wheat grains and wood chips were 60% and 40%, respectively, to prepare a nutrition bag; and (2) high-quality paddy soils were selected, especially deep-ploughing soil from paddy fields for long-term exposure to sunlight and insecticide treatment, then the soils were added caustic lime for disinfection treatment, meanwhile, the pH value of the soil substrates was monitored and controlled to 7.2 for air-drying treatment and crushing. Then the soils were mixed with the rice straw after fermentation pretreatment, and the mass ratios of soils and rice straw after fermentation pretreatment were 90% and 10%, respectively.

(3) Selection and application of cultivation baskets: the cultivation baskets with a volume of 30 liters (600× 396×182) were selected, the soils obtained in step (2) were transported to bed frames and filled, so that the culture substrate was filled evenly and the material surface was neat, wherein a thickness of the soil substrate was 18 cm. The soils were put into the bed frames, and spray humidification was performed so that the soil moisture reached 60%.

(4) Sowing and covering soil: the prepared cultivated species were uniformly performed broadcast sowing, cultivated species of *Morchella* were broken into strain blocks with a size of 2 cm, evenly sown on the surface of the culture substrate, and then covered with soil with a thickness of 3 cm. After sowing, the cultivated species were covered with black plastic film on the cultivation basket to keep warm and moist and prevent direct light.

(5) Mycelium culture: during the culture period of mycelium, soil humidity was 70% by controlling the humidity of the mushroom house and increasing the spraying method, temperatures of the mushroom house and the soil were controlled between 10° C. and 15° C., and a concentration of carbon dioxide was less than 3000 ppm. The conidia of the mycelium were produced, that was, after the fungus cream was produced, the nutrient bag with wheat grains as the main matrix was placed in time.

(6) Fruiting management: after 40 days of mycelium culture, the color of the mycelium deepened and the humidity of the growth room increased to 95%, and the humidity of the surface of the culture substrate materials was kept to be higher, light was turned on, 10 h a day, the light intensity was 500 lx. During the production of fruiting bodies, the humidity in the growth chamber was reduced to 85%, the humidity of the cultivation substrate soil was maintained at 75%, the temperature was increased and controlled within (15-18° C.), and after the fruiting bodies of *Morchella* were mature, they could be harvested.

Under the above cultivation method, the total test duration was 70 days, and the yield of *Morchella* was 0.53 kg/m$^2$.

Contrast Example 2

The present contrast example adopted a cultivation method of the prior art of CN 114303791 A, *Morchella sextelata* was taken as a strain, and the process was as follows:

a culture medium formula of cultivated species included by weight percentage: wheat 65%, mixed Chinese herbal medicine straw powder 30%, phosphate fertilizer 1%, caustic lime 1%, gypsum 1%, Shengtaibao of *Morchella* (nutrient solution) 1%, and dotriacontanol 1%, wherein the mixed Chinese herbal medicine straw powder included Bupleurum straw powder, Codonopsis straw powder and *Astragalus* straw powder according to a mass ratio of 1:1:1.

A formula of a culture substrate included by weight percentage: garden soil 65%, humus soil 32%, vermiculite 1%, organic fertilizer 1%, and caustic lime 1%, pH was 7.0, and a water content was 35%.

A preparation method for a nutrient solution: 1 g of magnesium sulfate, 2 g of potassium dihydrogen phosphate and 20 mL of Shengtaibao of *Morchella* (nutrient solution) were added to 30 kg 1 wt % sugar water (white sugar).

Cultivation Method:

(1) The wheat was soaked by 1 wt % limewater for 72 h, and then the raw materials were mixed according to the above culture medium formula of the cultivated species, the water was added so that a water content of the mixture was 65 wt %, and then the mixture was sterilized at 121° C. for 3 mh to obtain culture materials for reserve.

(2) The culture substrate was prepared according to the formula of the culture substrate for reserve.

(3) A strain bag was filled with the culture materials prepared in step (1), after inoculation of *Morchella*, the strain bag was cultured at 18° C. for 15 days, during the cultivation period, when the mycelium grew to ½ of the bag, the ½ of the full mycelium was buried in the culture substrate prepared in step (1), and the remaining ½ was left outside the culture substrate (this operation played a role of nutrient bag, which could improve the quality of the strain), and when the mycelium was full of the bag, sowing could be performed.

(4) A cultivation frame was filled with ⅔ of the height of the culture substrate prepared in step (2) (a water content of the culture substrate was 45 wt % at this time), and the strain cultivated in step (3) was sown, and a seeding rate was 0.37 kg/m$^2$; and a thickness of the covered culture substrate was 2-3 cm.

(5) Culture: indoor humidity was maintained at 85%-90%, an air temperature was maintained at (16-20° C.), substrate humidity was maintained at 30%-40%, and a surface temperature of the substrate was maintained at (11-15° C.) Before fruiting, the light was controlled to (1100-1200) lx, and a concentration of carbon dioxide was controlled to (4500-5000) mg/mL; and after fruiting, the light was controlled below 500 lx, and a concentration of carbon dioxide was controlled to (8000-9500) mg/mL.

(6) After sowing, every 3 days, 20 mL/m$^2$ of nutrient solution was sprayed in atomization from 7:30 pm to 8:30 pm.

Under the above cultivation method, the total test duration was 70 days, and the yield of *Morchella* was 0.44 kg/m$^2$.

The above descriptions are only the preferred embodiments of the present disclosure. It is to be pointed out that for those of ordinary skill in the art, without deviating from the principle of the invention, a number of improvements and retouchings can be made, which should also be regarded as the protection scope of the present disclosure.

What is claimed is:

1. A cultivation method for *Morchella* on patterned layer frames, comprising the following steps:
    (1) preparing and laying a culture substrate, and sowing;
    (2) supplementing an exogenous nutrient material, and controlling a temperature of the culture substrate at (5-9° C.), to perform a transformation of the exogenous nutrition material;
    (3) controlling the temperature of the culture substrate at (5-9° C.), to perform a mycelium culture;
    (4) controlling the temperature of the culture substrate at (2-4° C.) after a mycelium matures, to perform a primordium induction;
    (5) inducing a primordium differentiation, wherein the temperature of the culture substrate during the primordium differentiation is (5-9° C.);
    (6) managing a young mushroom, wherein the temperature of the culture substrate at a young mushroom period is (9-12° C.);
    (7) managing mature mushrooms, wherein the temperature of the culture substrate in a mature period is (12-16° C.); and
    (8) performing a second flush mushroom management;
    wherein the culture substrate is made of a first raw material comprising the following components in weight percentages: 34-55% of mountain raw soil, 40-60% of grass carbon, 1-3% of caustic lime, 2-4% of gypsum, and 0.05-0.2% of potassium dihydrogen phosphate; and wherein a time of the primordium induction is (3-7) days.

2. The cultivation method according to claim 1, wherein the step of preparing and laying the culture substrate further comprises: mixing each component of the first raw material, adjusting a water content of the first raw material to 20-30% using an aqueous solution containing 2% formaldehyde, and sealing for more than 5 days; and wherein a thickness of the culture substrate is (20-30) cm.

3. The cultivation method according to claim 2, wherein the step of sowing further comprises: evenly spreading *Morchella* strain blocks with a size of (1-1.5) cm on a bed surface of (0.4-0.6) kg per square meter, covering the culture substrate with a thickness of (1-2) cm, setting an ambient temperature to (10-15° C.), an air humidity of the culture substrate to (70-80) %, and a concentration of carbon dioxide to (500-800) ppm, and culturing in a no light condition.

4. The cultivation method according to claim 3, wherein the exogenous nutrient material is made from a second raw material comprising the following components in weight percentages: 55-65% of wheat, 30-40% of corn core, 1-2% of the caustic lime, 1-2% of the gypsum, and 0.5-2% of the potassium dihydrogen phosphate; wherein
    a supplement time of the exogenous nutrient material is (2-4) days after the sowing step, and a supplement amount of the exogenous nutrient material is (4-8) kg per square meter; and wherein during the transformation of the exogenous nutrition, a water content of the culture substrate is (20-25) %, wherein a concentration of the carbon dioxide is (500-800) ppm, and an air humidity of the culture substrate is (70-80) %; and wherein the transformation is performed without light for (5-7) days.

5. The cultivation method according to claim 4, wherein in the step of performing the mycelium culture, a water content of the culture substrate is controlled to (20-25) %, an air humidity of the culture substrate is controlled to (70-80) %, and a concentration of the carbon dioxide is controlled to (800-1500) ppm, and wherein the mycelium culture is performed without light for (45-60) days.

6. The cultivation method according to claim 5, wherein during the primordium induction step, a water content and an air humidity of the culture substrate are consistent with the water content and the air humidity of the culture substrate during the mycelium culture step; wherein, after the primordium induction step, the exogenous nutrient material is removed, and a concentration of the carbon dioxide is reduced to 500 ppm by a ventilation; and wherein during a ventilation period, a water content of the culture substrate is (25-30) %, a temperature of the culture substrate is (5-9° C.), an air humidity of the culture substrate is (70-80) %, a light intensity is (400-600) lx, a light source is a red light, and wherein the primordium induction is performed under alternating cycles of light (8-12) h and dark (4-6) h.

7. The cultivation method according to claim 6, wherein during the primordium differentiation, a water content of the culture substrate is controlled to (25-28) %, an air humidity of the culture substrate is controlled to (90-95) %, a concentration of the carbon dioxide is controlled below 800 ppm, a light intensity is controlled to (400-600) lx, and a light source is controlled to be the red light, and wherein the primordium differentiation is performed under alternating cycles of light (8-12) h and dark (4-6) h until a primordium differentiates and develops to more than 1.5 cm.

8. The cultivation method according to claim 7, wherein during the step of managing the young mushroom, a water content of the culture substrate is controlled to (25-28) %, an air humidity of the culture substrate is controlled to (80-90) %, a concentration of the carbon dioxide is controlled below 800 ppm, a light intensity is controlled to (400-600) lx, and a light source is controlled to be the red light, and wherein the managing the young mushroom is performed under alternating cycles of light (8-12) h and dark (4-6) h until the primordium differentiates and develops to more than 3 cm.

9. The cultivation method according to claim 8, wherein during the step of managing mature mushrooms, a water content of the culture substrate is controlled to (20-25) %, an air humidity of the culture substrate is controlled to (70-85) %, a concentration of the carbon dioxide is controlled below 800 ppm, a light intensity is controlled to (400-600) lx, and a light source is controlled to be the red light, and wherein the managing mature mushrooms is performed under alternating cycles of light (8-12) h and dark (4-6) h until ascocarps of the *Morchella* reach more than 7 cm for a harvesting.

10. The cultivation method according to claim 9, wherein the step of performing the second flush mushroom management comprises the steps of: after completing all the harvesting, digging out residual stipes in a soil, clearing dead mushrooms, adjusting a water content of the culture substrate to (25-28) % using a (0.05-0.2) % caustic lime water, and repeating the steps (5)-(7).

\*  \*  \*  \*  \*